United States Patent
Kushnir

(10) Patent No.: US 10,158,522 B2
(45) Date of Patent: Dec. 18, 2018

(54) NETWORK MONITOR AND METHOD FOR EVENT BASED PREDICTION OF RADIO NETWORK OUTAGES AND THEIR ROOT CAUSE

(71) Applicant: Dan Kushnir, Springfield, NJ (US)

(72) Inventor: Dan Kushnir, Springfield, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/393,745

(22) Filed: Dec. 29, 2016

(65) Prior Publication Data

US 2018/0191552 A1 Jul. 5, 2018

(51) Int. Cl.
*H04L 12/24* (2006.01)
*H04L 12/26* (2006.01)

(52) U.S. Cl.
CPC .......... *H04L 41/064* (2013.01); *H04L 41/147* (2013.01); *H04L 41/16* (2013.01); *H04L 43/16* (2013.01); *H04L 41/142* (2013.01)

(58) Field of Classification Search
CPC ...... H04L 41/064; H04L 43/16; H04L 41/142
See application file for complete search history.

(56) References Cited

U.S. PATENT DOCUMENTS 5,748,098 A * 5/1998 Grace ................. H04L 41/0631
340/3.41
6,253,339 B1 * 6/2001 Tse ....................... H04Q 3/0075
370/216

(Continued)

FOREIGN PATENT DOCUMENTS

EP 2 871 803 A1 5/2015
EP 3 110 198 A2 12/2016

OTHER PUBLICATIONS

"International Search Report", dated Mar. 12, 2018 in PCT Application No. PCT/US2017/066949.

(Continued)

Primary Examiner — Mohammad S Anwar
(74) Attorney, Agent, or Firm — Kramer Amado, P.C.

(57) ABSTRACT

Various embodiments relate to a network monitor and method thereof for receiving a plurality of alarms during a baseline period from a plurality of network elements, establishing a baseline for at least one of the plurality of the network elements by determining a number of the plurality of alarms during the baseline period that occur during each of a plurality of sub-intervals within the baseline period, calculating a mean arrival rate for each of the plurality of alarms during the baseline period, generating a probability density function for an arrival rate for each of the plurality of alarms during the baseline period, calculating a probabilistic score for each of a plurality of alarms during a test period based on the probability density function for the arrival rate of each of the plurality of alarms during the baseline period, determining if the score for each of the plurality of alarms during the test period is greater than or equal to a probabilistic threshold, summing the number of the scores for each of the plurality of alarms during the test period that is greater than or equal to probabilistic threshold, generating a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold, reporting first network elements of the generated list and reporting alarms for the first network elements of the generated list having probabilistic scores higher than the probabilistic threshold.

24 Claims, 3 Drawing Sheets

(56) References Cited

U.S. PATENT DOCUMENTS

| | | | |
|---|---|---|---|
| 7,383,191 B1* | 6/2008 | Herring | G06Q 30/0283 |
| | | | 379/111 |
| 2008/0250265 A1* | 10/2008 | Chang | G06F 11/008 |
| | | | 714/4.12 |
| 2015/0280973 A1 | 10/2015 | Ko et al. | |
| 2016/0162346 A1 | 6/2016 | Kushnir et al. | |

OTHER PUBLICATIONS

Marnerides, et al., "Traffic anomaly diagnosis in Internet backbone networks: A survey", Computer Networks, Elsevier Amsterdam, NL, vol. 73, Aug. 23, 2014 (Aug. 23, 2014), pp. 224-243.

* cited by examiner

NETWORK MONITOR AND METHOD FOR EVENT BASED PREDICTION OF RADIO NETWORK OUTAGES AND THEIR ROOT CAUSE

TECHNICAL FIELD

The disclosure relates generally to predicting network outages, such as for example, radio network outages based on past events, and more specifically, but not exclusively, to an automatic machine learning based tool which predicts outages in networks by examining past data.

BACKGROUND

When network failures occur, customers of network providers, such as users, service providers, or other consumers of network bandwidth may experience a service degradation where their level of service is diminished from a range where service is interrupted or merely not optimal.

The problem arises when there are radio network outages. Currently, there exists various reporting tools for reporting network outages, however, none of these reporting tools provide as output a propensity of a component to go into outage state.

There are not any systems which are automatic statistical systems which produce as an output, a list of network elements that are likely to have an outage as well as the root cause for the possible outage.

As stated, most of current tools are either reporting tools or tools that are used to visualize monitored key performance indicators ("KPIs").

SUMMARY OF EXEMPLARY EMBODIMENTS

A brief summary of various embodiments is presented below. Embodiments address the need to predict network outages based on past data.

In order to overcome these and other shortcomings of the prior art and in light of the need for a method to predict network outages based on past data, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method of predicting outages in radio networks the method including receiving a plurality of alarms during a baseline period from a plurality of network elements, establishing a baseline for at least one of the plurality of the network elements by determining a number of the plurality of alarms during the baseline period that occur during each of a plurality of sub-intervals within the baseline period, calculating a mean arrival rate for each of the plurality of alarms during the baseline period, generating a probability density function for an arrival rate for each of the plurality of alarms during the baseline period, calculating a probabilistic score for each of a plurality of alarms during a test period based on the probability density function for the arrival rate of each of the plurality of alarms during the baseline period, determining if the score for each of the plurality of alarms during the test period is greater than or equal to a probabilistic threshold, summing the number of the scores for each of the plurality of alarms during the test period that is greater than or equal to probabilistic threshold, generating a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold; reporting first network elements of the generated list and reporting alarms for the first network elements of the generated list having probabilistic scores higher than the probabilistic threshold.

In an embodiment of the present disclosure, applying a threshold to the list of the plurality of network elements and recommending corrective action to the plurality of network elements above the threshold.

In an embodiment of the present disclosure, the plurality of alarms are time stamped and include severity of an event, start time of the event and end time of the event.

In an embodiment of the present disclosure, the baseline period is established during the time period with no outages.

In an embodiment of the present disclosure, the probabilistic score is between 0 and 1.

In an embodiment of the present disclosure, the score greater than or equal to the probabilistic threshold is an indication that the network element will have an outage and the score less than the probabilistic threshold is an indication that the network element will not have an outage.

In an embodiment of the present disclosure, the probabilistic threshold is based on the baseline period.

In an embodiment of the present disclosure, the probability density function corresponds to a Poisson distribution.

Various embodiments described herein relate to a network monitor for predicting outages in radio networks, including a processor; and a memory, the memory storing program code executable by the processor, the processor being configured to receive a plurality of alarms during a baseline period from a plurality of network elements, establish a baseline for at least one of the plurality of the network elements by determining a number of the plurality of alarms during the baseline period that occur during each of a plurality of sub-intervals within the baseline period, calculate a mean arrival rate for each of the plurality of alarms during the baseline period, generate a probability density function for an arrival rate for each of the plurality of alarms during the baseline period, calculate a probabilistic score for each of a plurality of alarms during a test period based on the probability density function for the arrival rate of each of the plurality of alarms during the baseline period, determine if the score for each of the plurality of alarms during the test period is greater than or equal to a probabilistic threshold, sum the number of the scores for each of the plurality of alarms during the test period that is greater than or equal to probabilistic threshold, generate a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold, report first network elements of the generated list and report alarms for the first network elements of the generated list having probabilistic scores higher than the probabilistic threshold.

In an embodiment of the present disclosure, applying a threshold to the list of the plurality of network elements and recommending corrective action to the plurality of network elements above the threshold.

In an embodiment of the present disclosure, the plurality of alarms are time stamped and include severity of an event, start time of the event and end time of the event.

In an embodiment of the present disclosure, the baseline period is established during the time period with no outages.

In an embodiment of the present disclosure, the score is between 0 and 1.

In an embodiment of the present disclosure, the score greater than or equal to the probabilistic threshold is an indication that the network element will have an outage and the score less than the probabilistic threshold is an indication that the network element will not have an outage.

In an embodiment of the present disclosure, the probabilistic threshold is based on the baseline period.

In an embodiment of the present disclosure, the probability density function corresponds to a Poisson distribution.

Various embodiments described herein relate to a tangible and non-transitory machine-readable storage medium encoded with instructions thereon for execution by a network monitor, wherein said tangible and non-transitory machine-readable storage medium including instructions for receiving a plurality of alarms during a baseline period from a plurality of network elements, instructions for establishing a baseline for at least one of the plurality of the network elements by determining a number of the plurality of alarms during the baseline period that occur during each of a plurality of sub-intervals within the baseline period, instructions for calculating a mean arrival rate for each of the plurality of alarms during the baseline period, instructions for generating a probability density function for an arrival rate for each of the plurality of alarms during the baseline period, instructions for calculating a probabilistic score for each of a plurality of alarms during a test period based on the probability density function for the arrival rate of each of the plurality of alarms during the baseline period, instructions for determining if the score for each of the plurality of alarms during the test period is greater than or equal to a probabilistic threshold, instructions for summing the number of the scores for each of the plurality of alarms during the test period that is greater than or equal to probabilistic threshold, instructions for generating a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold and reporting first network elements of the generated list, and instructions for reporting alarms for the first network elements of the generated list having probabilistic scores higher than the probabilistic threshold.

In an embodiment of the present disclosure, applying a threshold to the list of the plurality of network elements and recommending corrective action to the plurality of network elements above the threshold.

In an embodiment of the present disclosure, the plurality of alarms are time stamped and include severity of an event, start time of the event and end time of the event.

In an embodiment of the present disclosure, the baseline period is established during the time period with no outages.

In an embodiment of the present disclosure, the probabilistic score is between 0 and 1.

In an embodiment of the present disclosure, the score greater than or equal to the probabilistic threshold is an indication that the network element will have an outage and the score less than the probabilistic threshold is an indication that the network element will not have an outage.

In an embodiment of the present disclosure, the probabilistic threshold is based on the baseline period.

In an embodiment of the present disclosure, the probability density function corresponds to a Poisson distribution.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features of the present invention are more fully disclosed in the following specification, reference being had to the accompanying drawings, in which.

Figure 1:
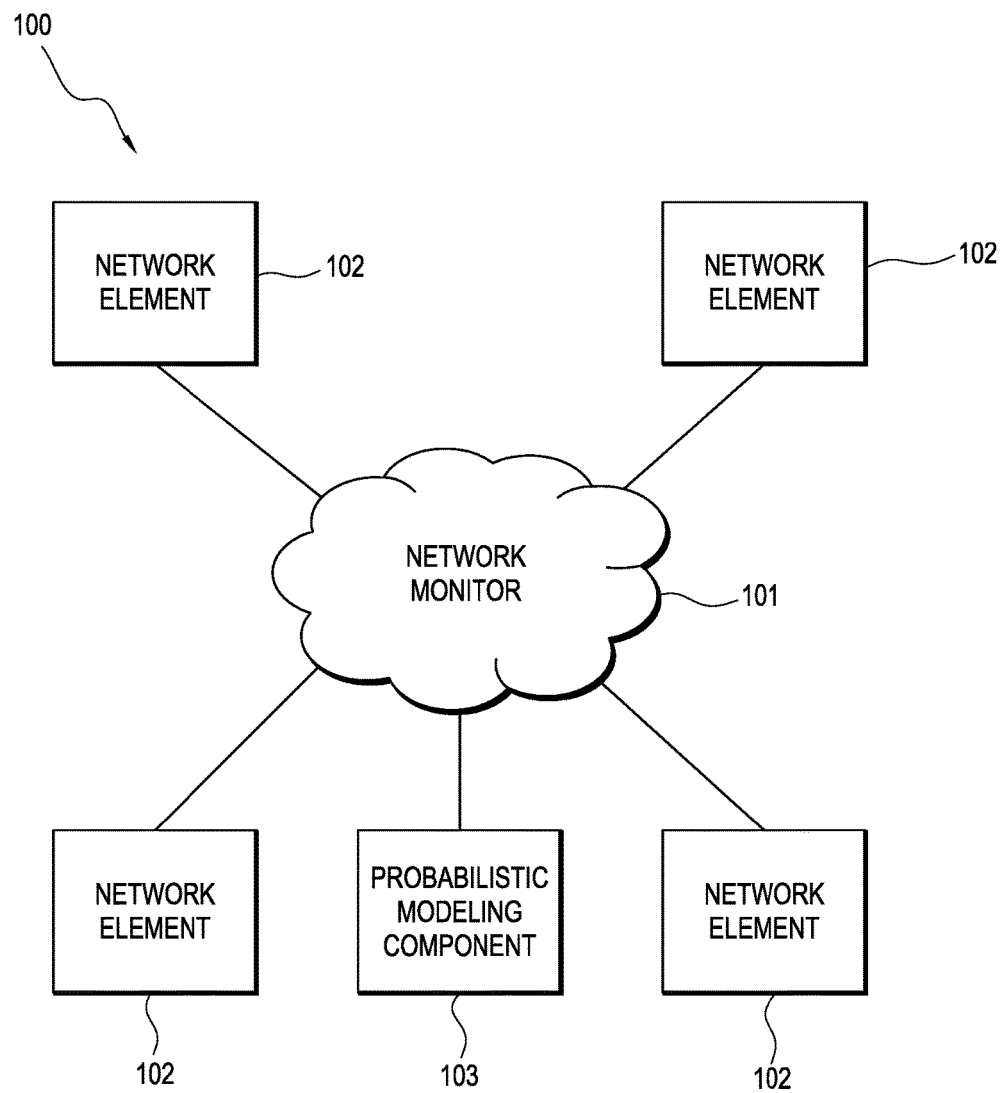
FIG. 1 illustrates a block diagram of an exemplary system for predicting radio network outages.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Individual components of communication networks may fail outright or function at a level inadequate to bear the demands of the network. Although degradation of network service is most often caused by the failure or inadequacy of network components, when service degradation occurs it is possible to predict outages based on past performance of the network component. Most existing methods merely report an outage and fail to predict that a network element is trending towards an outage, or to automatically detect the root cause of such a failure.

A network monitor which monitors KPIs and alarm event data may assist service providers and pro-active care teams to identify network elements that are behaving erroneously and causing degradation of network service. Because the network monitor may be based upon observed and measured data rather than conditions known by network administrators, such a model is vendor and technology agnostic.

The network elements may be base station controllers. Various embodiments described below will include radio networks, but the embodiments described may also be applied to sorts of networks.

As described below, this network monitor is configured to detect possible network outages before their occurrence and direct pro-active care network teams to the root cause of the outage. More specifically, it allows pro-active care network teams to continuously monitor the network and receive automated indications on other possible network outages with more specific information on their likelihood of another outage to occur as well as on the root cause and possible resolution to the problem(s).

The network monitor provides an automatic prediction of network outages together with reporting leading root causes related to the event alarm data. The network monitor does not require any human intervention or domain knowledge. This network monitor does not rely on any human intervention or domain knowledge to predict the outage. As such, it performs a more advanced analysis and recommendation than currently available, which as discussed merely provide reporting and visualization of metrics in network outages.

Referring now to the drawings, in which like numerals refer to like components or steps, there are disclosed broad aspects of various exemplary embodiments.

FIG. 1 illustrates an exemplary system 100 for predicting radio network outages. A system 100 may include a network monitor 101 and may include a number of components such as network elements 102 and devices which may be sampled for KPIs and for alarm event data (also referred to as alarms), which may differ depending on the type of network or system.

For example, in a telecommunications network KPIs may include metrics such as, for example, buffer size load, device power consumption, CPU, memory, hard disk utilization, interface utilization, packet drop rate, buffer occupancy, counters, call success rate, channel congestion, call drop rate, data packet loss rate, call setup time, and handover success rate.

The network monitor 101 receives data (for example, KPIs and alarm event data) that is being fed into the network monitor 101 from the various network elements 102 and examines historic data, during normal network behavior (i.e. no outages in the network element) to establish a baseline for each network element 102 for the behavior of the respective KPIs and alarm event data. The aim is to rank the propensity of the monitored network elements 102 to fail and to create predictions of network outages by constructing patterns (i.e. probability density functions) of KPIs and alarm event data (hereinafter referred to as "alarm") that characterizes the network healthy profile and further detects significant deviations from these constructed patterns.

The baseline approximation is constructed during a baseline period (T) which is defined by t(1), . . . , t(q) which are partitions of this period by being divided into q sub-intervals.

During each time interval t(i), the number of alarms that occurred during t(i) are counted. The counter counts the number of alarms during each sub-interval during the baseline period. Denote by $C_{ik}(X_j)$ such a counter for alarm of type events occurring during the t(i) sub-interval in a network element $X_j$.

After the counter has finished counting the number of alarms during each sub-interval during the baseline period, the mean arrival rate is calculated by:

$$\lambda_k(X_j) = \frac{1}{q}\Sigma_i C_{ik}(X_j)$$

$\lambda_k(X_j)$ is the mean arrival rate.

The value q is the number of sub-intervals in the baseline period (T).

The summation of the total number of alarms during the baseline period is divided by the number of sub-intervals.

The probability density function, for example, corresponding to a probability distribution for every alarm is calculated by:

$$P(m \text{ events in interval } t) = \frac{(\lambda_k(X_j))^m e^{-\lambda_k(X_j)}}{m!}$$

For example, the calculated mean arrival rate is used in a Poisson function to calculate the probability of the alarms occurring 'm' times during a sub-interval.

The value m is the number of alarms in the sub-time interval.

After the baseline is created, a test period (i.e. a period after the baseline period) is examined on the system 101 for every alarm in each of the several monitored network elements 102 and a score (which is typically between 0 and 1) is calculated based on the probability of observed alarm arrival rate exceeding the arrival rates that were observed during the baseline period.

Stated another way, each alarm (from the test period), whose arrival rate is $\lambda_{test}$, is scored based on the probability of having rates higher or equal to the arrival rates observed during the baseline period: $P(x \leq \lambda_{test})$.

The thresholding of the score for each alarm event data is performed by application of the following condition:

$$P(x \leq \lambda_{test}) \geq \alpha, s.t. \alpha \in [0,1]$$

The value $\alpha$ is the probabilistic threshold. This may also be referred to as a confidence value.

A second score for each network element can either be calculated by counting the number of alarms during the test period that passed a probabilistic threshold $\alpha \in [0,1]$ or the score for each network element can be determined by summing the alarm score values which passed the probabilistic threshold.

A second score (calculated above) is then recorded for each of the alarms in each of the network elements 102. The network element score may be "thresholded" meaning that scores that are above a threshold β (e.g. β=32 alarms) is indicative of the network element likely going into an outage state and scores that are below β are counted as not being indicative of the network element going into an outage stage.

The system 101 then counts all such alarms that occurred in a specific network element 102 using $\Gamma(X_j)=\Sigma_{e\_k} I_\alpha$, where the indicator function $I_\alpha$ counts the number of alarms that crossed the probabilistic threshold during the test period for network element $X_j$.

The system 101 then reports a ranked list of network elements 102 and their probabilistic scores together with flags (i.e. likely to go into an outage state) and alarms that have been marked as crossing the probabilistic threshold to create a list of outage as $\Gamma(X_1), \ldots, \Gamma(X_N)$.

In another embodiment, a threshold maybe applied to the ranked list to recommend the top entries on the list for pro-active care.

The root cause analysis is performed for every network element by reporting the top scoring alarms that pass the probabilistic threshold as the root cause of the outage.

The data, known as alarms including KPIs and alarm event data is time series data and may be time stamped and further include identifiers which include other information including, but not limited to, the severity of the event, the start time and end time of the event.

Figure 2:
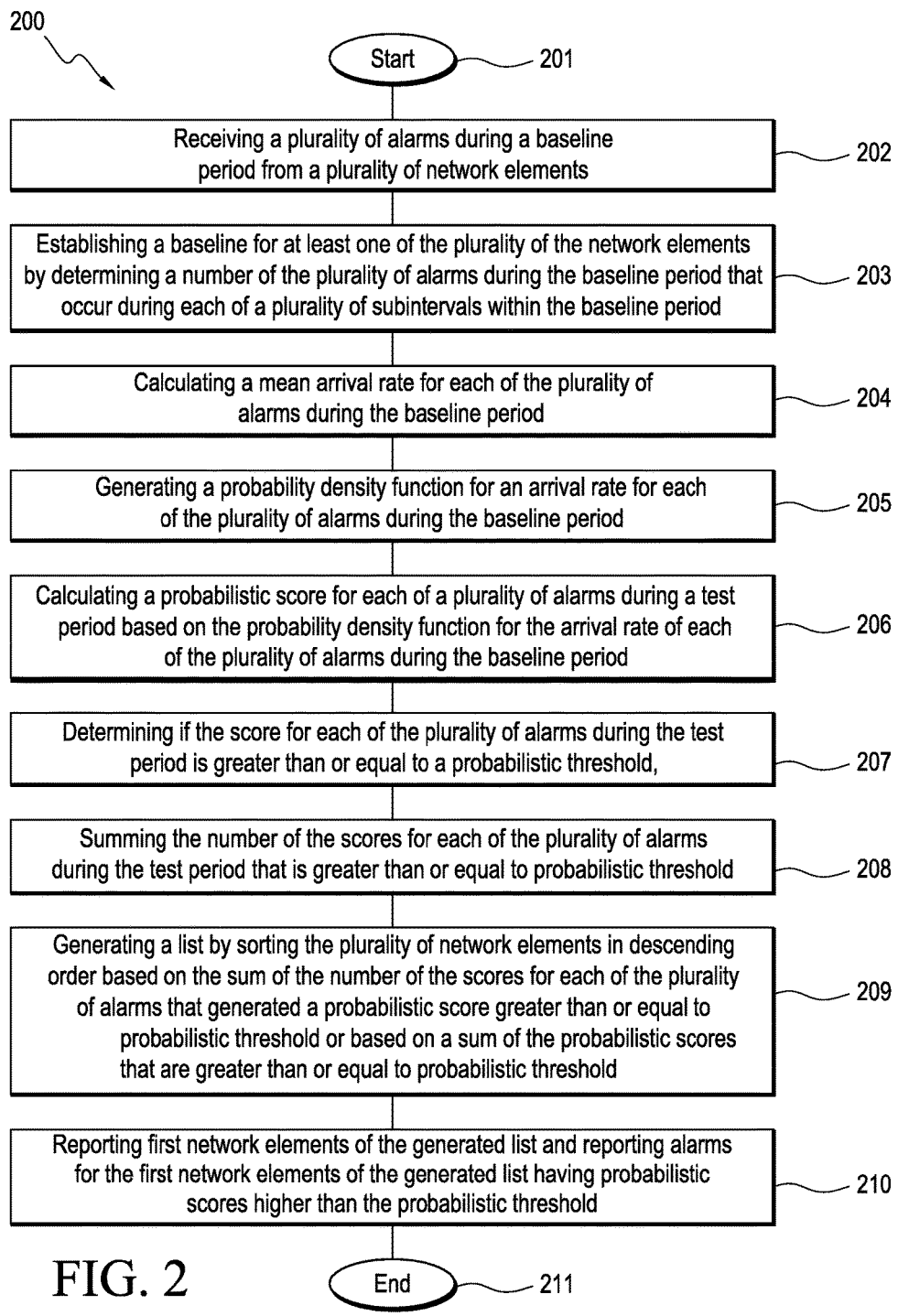
FIG. 2 illustrates a flow chart of an exemplary method for predicting radio network outages.

FIG. 2 is illustrates a flow chart of an exemplary method for predicting radio network outages. The method 200 begins at step 201 and proceeds to step 202 where the network monitor receives a plurality of alarms from the network elements during the baseline period.

The method 200 proceeds to step 203 where a baseline is established for the network elements by determining the number of alarms during the baseline period that occur during each of the sub-intervals in the baseline period.

The method 200 proceeds step 204 to calculate a mean arrival rate for the number of alarms that occur during the sub-intervals within the baseline period by summing the number of alarms and dividing the number of alarms by the number of sub-intervals.

The method 200 proceeds to step 205 where a probability density function is generated for a frequency of arrival for each of the plurality of alarms during the baseline period.

The probability density function may be any function, such as a function corresponding to the Poisson distribution or a distribution based upon data collected from a certain type of network element.

The method 200 proceeds to step 206 where a score is calculated for each alarm during a test period, which is based on the probability density function of the arrival rates of each of the plurality of alarms observed during the baseline period. The score may be between 0 and 1.

The method 200 proceeds to step 207 where it is determined which of the plurality of alarms during the test period has a probability score which is greater than or equal to a probabilistic threshold.

The probabilistic threshold may be set by the user or be based on the baseline period.

The method 200 proceeds to step 208 where the number of alarms whose scores are greater than or equal to the probabilistic threshold during the test period are counted, or their scores are summed, for each network element.

The method 200 proceeds to step 209 where a list is generated by sorting the plurality of network elements in descending order based on the sum of the number of the scores of each of the plurality of alarms that generated a probabilistic score greater than or equal to probabilistic threshold or based on a sum of the scores.

The method 200 proceeds to step 210 where a first network element of the generated list is reported.

The method 200 ends at step 211.

For example, this method may be used to receive data from various base station controllers during a period of no outages. An outage may take place in the last two days of the period. The scores calculated will be graphed for each base station controller over the entire period (baseline period and test period). For example, days 1-10 may be the baseline period and days 11-20 may be the test period. The method is capable of detecting that the root cause of the network outage is related to a malfunction underlined by an alarm which significantly deviated from its baseline arrival rate as measure by the scoring methodology described above.

A person skilled in the art will appreciate that a variety of different methods for predicting radio network outages may be used.

Figure 3:
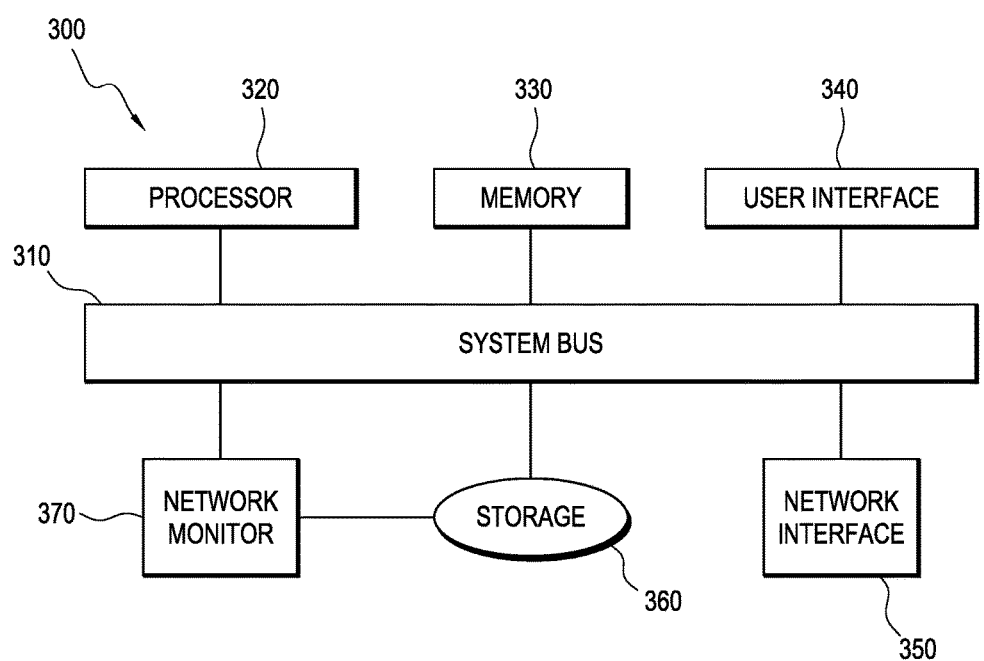
FIG. 3 illustrates a block diagram of an exemplary hardware diagram, for a network monitor to predict radio network outages.

FIG. 3 illustrates an exemplary hardware diagram for a device 300 such as device including a system to predict radio network outages. The exemplary device 300 may correspond to network monitor 100 of FIG. 1. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store steps for predicting network outages.

According to the foregoing, various exemplary embodiments provide for predicting radio network outages.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as non-general purpose microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of predicting outages in radio networks, the method comprising:

receiving a plurality of alarms during a baseline period from a plurality of network elements;

establishing a baseline for at least one of the plurality of the network elements by determining a number of the plurality of alarms during the baseline period that occur during each of a plurality of sub-intervals within the baseline period;

calculating a mean arrival rate for each of the plurality of alarms during the baseline period;

generating a probability density function for an arrival rate for each of the plurality of alarms during the baseline period;

calculating a probabilistic score for each of a plurality of alarms during a test period based on the probability density function for the arrival rate of each of the plurality of alarms during the baseline period;

determining if the score for each of the plurality of alarms during the test period is greater than or equal to a probabilistic threshold;

summing the number of the scores for each of the plurality of alarms during the test period that is greater than or equal to probabilistic threshold;

generating a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold;

reporting first network elements of the generated list and reporting alarms for the first network elements of the generated list having probabilistic scores higher than the probabilistic threshold.

2. The method of claim 1, further comprising applying a threshold to the list of the plurality of network elements and recommending corrective action to the plurality of network elements above the threshold.

3. The method of claim 1, wherein the plurality of alarms are time stamped and include severity of an event, start time of the event and end time of the event.

4. The method of claim 1, wherein the baseline period is established during the time period with no outages.

5. The method of claim 1, wherein the probabilistic score is between 0 and 1.

6. The method of claim 1, wherein the score greater than or equal to the probabilistic threshold is an indication that the network element will have an outage and the score less than the probabilistic threshold is an indication that the network element will not have an outage.

7. The method of claim 1, wherein the probabilistic threshold is based on the baseline period.

8. The method of claim 1, wherein the probability density function corresponds to a Poisson distribution.

9. A network monitor for predicting outages in radio networks, comprising:
a processor; and
a memory, the memory storing program code executable by the processor, the processor being configured to:
receive a plurality of alarms during a baseline period from a plurality of network elements;
establish a baseline for at least one of the plurality of the network elements by determining a number of the plurality of alarms during the baseline period that occur during each of a plurality of sub-intervals within the baseline period;
calculate a mean arrival rate for each of the plurality of alarms during the baseline period;
generate a probability density function for an arrival rate for each of the plurality of alarms during the baseline period;
calculate a probabilistic score for each of a plurality of alarms during a test period based on the probability density function for the arrival rate of each of the plurality of alarms during the baseline period;
determine if the score for each of the plurality of alarms during the test period is greater than or equal to a probabilistic threshold;
sum the number of the scores for each of the plurality of alarms during the test period that is greater than or equal to probabilistic threshold;
generate a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold;
report first network elements of the generated list and report alarms for the first network elements of the generated list having probabilistic scores higher than the probabilistic threshold.

10. The network monitor of claim 9, further comprising applying a threshold to the list of the plurality of network elements and recommending corrective action to the plurality of network elements above the threshold.

11. The network monitor of claim 9, wherein the plurality of alarms are time stamped and include severity of an event, start time of the event and end time of the event.

12. The network monitor of claim 9, wherein the baseline period is established during the time period with no outages.

13. The network monitor of claim 9, wherein the score is between 0 and 1.

14. The network monitor of claim 9, wherein the score greater than or equal to the probabilistic threshold is an indication that the network element will have an outage and the score less than the probabilistic threshold is an indication that the network element will not have an outage.

15. The network monitor of claim 9, wherein the probabilistic threshold is based on the baseline period.

16. The network monitor of claim 9, wherein the probability density function corresponds to a Poisson distribution.

17. A tangible and non-transitory machine-readable storage medium encoded with instructions thereon for execution by a network monitor, wherein said tangible and non-transitory machine-readable storage medium comprising:
instructions for receiving a plurality of alarms during a baseline period from a plurality of network elements;
instructions for establishing a baseline for at least one of the plurality of the network elements by determining a number of the plurality of alarms during the baseline period that occur during each of a plurality of sub-intervals within the baseline period;
instructions for calculating a mean arrival rate for each of the plurality of alarms during the baseline period;
instructions for generating a probability density function for an arrival rate for each of the plurality of alarms during the baseline period;
instructions for calculating a probabilistic score for each of a plurality of alarms during a test period based on the probability density function for the arrival rate of each of the plurality of alarms during the baseline period;
instructions for determining if the score for each of the plurality of alarms during the test period is greater than or equal to a probabilistic threshold;
instructions for summing the number of the scores for each of the plurality of alarms during the test period that is greater than or equal to probabilistic threshold;
instructions for generating a list by sorting the plurality of network elements in descending order based on the sum of the number of the scores for each of the plurality of alarms that generated a probabilistic score greater than or equal to probabilistic threshold or based on a sum of the probabilistic scores that are greater than or equal to probabilistic threshold;
instructions for reporting first network elements of the generated list and reporting alarms for the first network elements of the generated list having probabilistic scores higher than the probabilistic threshold.

18. The tangible and non-transitory machine-readable storage medium of claim 17, further comprising applying a threshold to the list of the plurality of network elements and recommending corrective action to the plurality of network elements above the threshold.

19. The tangible and non-transitory machine-readable storage medium of claim 17, wherein the plurality of alarms are time stamped and include severity of an event, start time of the event and end time of the event.

20. The tangible and non-transitory machine-readable storage medium of claim 17, wherein the baseline period is established during the time period with no outages.

21. The tangible and non-transitory machine-readable storage medium of claim 17, wherein the probabilistic score is between 0 and 1.

22. The tangible and non-transitory machine-readable storage medium of claim 17, wherein the score greater than or equal to the probabilistic threshold is an indication that the network element will have an outage and the score less than the probabilistic threshold is an indication that the network element will not have an outage.

23. The tangible and non-transitory machine-readable storage medium of claim 17, wherein the probabilistic threshold is based on the baseline period.

24. The tangible and non-transitory machine-readable storage medium of claim 17, wherein the probability density function corresponds to a Poisson distribution.

* * * * *